United States Patent
Solheim

(10) Patent No.: US 8,672,405 B2
(45) Date of Patent: Mar. 18, 2014

(54) SITTING ARRANGEMENT

(75) Inventor: Albert Solheim, Ikornnes (NO)

(73) Assignee: Ekornes ASA, Ikornnes (NO)

(*) Notice: Subject to any disclaimer, the term of this patent is extended or adjusted under 35 U.S.C. 154(b) by 0 days.

(21) Appl. No.: 13/809,590

(22) PCT Filed: Jul. 15, 2011

(86) PCT No.: PCT/NO2011/000209
§ 371 (c)(1),
(2), (4) Date: Jan. 10, 2013

(87) PCT Pub. No.: WO2012/008852
PCT Pub. Date: Jan. 19, 2012

(65) Prior Publication Data
US 2013/0127220 A1 May 23, 2013

(30) Foreign Application Priority Data

Jul. 15, 2010 (NO) .................................. 20101008
Oct. 19, 2010 (WO) ............... PCT/NO2010/000369

(51) Int. Cl.
A47C 17/04 (2006.01)

(52) U.S. Cl.
USPC ................... 297/284.3; 297/313; 297/423.3; 5/618

(58) Field of Classification Search
USPC ............. 297/284.3, 284.11, 312, 313, 423.3; 5/613, 618, 619
See application file for complete search history.

(56) References Cited

U.S. PATENT DOCUMENTS

| 1,167,074 A | * | 1/1916 | Hurley | 297/461 |
| 2,716,566 A | | 8/1955 | Thiry | |
| 3,565,482 A | * | 2/1971 | Blodee | 297/284.3 |
| 3,974,530 A | | 8/1976 | Lusch | |
| 4,277,858 A | * | 7/1981 | Bohme | 5/618 |
| 5,316,370 A | * | 5/1994 | Newman | 297/313 |
| 5,716,099 A | * | 2/1998 | McDiarmid | 297/302.1 |
| 6,168,233 B1 | | 1/2001 | Markus | |

(Continued)

FOREIGN PATENT DOCUMENTS

| CA | 2095295 A1 | 10/1994 |
| DE | 29800216 U1 | 11/1998 |

(Continued)

OTHER PUBLICATIONS

International Search Report mailed Apr. 15, 2011 in PCT/NO2010/000369.

(Continued)

Primary Examiner — Peter Brown
(74) Attorney, Agent, or Firm — Oppedahl Patent Law Firm LLC

(57) ABSTRACT

Chaise longue comprising a sofa frame (2), seat part (4) and back rest (3). The seat part (4) comprises side bars (9a, b), cross bars (10a, b) and seat springs (7). The seat part (4) is rotatably connected to the sofa frame (2) by means of mounting devices (8a, b) below the sitting surface of the seat part. One or more balance springs (14) are arranged between the seat part (4) and the sofa frame (2). A shutter or flap (16) is rotatably mounted to the seat part with pivotable joints (17a, b). The flap is furthermore rotatably connected to the sofa frame in point at the opposite end from the joints.

6 Claims, 4 Drawing Sheets

(56) References Cited

U.S. PATENT DOCUMENTS

| | | | |
|---|---|---|---|
| 6,890,030 B2 * | 5/2005 | Wilkerson et al. | 297/284.11 |
| 7,234,772 B2 * | 6/2007 | Wells | 297/262.1 |
| 2002/0145321 A1 * | 10/2002 | Brightbill et al. | 297/312 |

FOREIGN PATENT DOCUMENTS

| | | |
|---|---|---|
| GB | 437114 A | 10/1935 |
| GB | 513387 A | 10/1939 |
| WO | 2011049461 A2 | 4/2011 |

OTHER PUBLICATIONS

Written Opinion mailed Apr. 15, 2011 in PCT/NO2010/000369.

Written Opinion mailed Oct. 17, 2011 in PCT/NO2011/000209.

International Search Report mailed Oct. 17, 2011 in PCT/NO2011/000209.

International Preliminary Report on Patentability dated Jul. 2, 2012 in PCT/NO2011/000209.

* cited by examiner

SITTING ARRANGEMENT

The present inventoin relates to a chaise longue, also called longseat, and to an elastic joint for the use in it.

From U.S. Pat. No. 3,974,630, it is known an adjustable basevfor the use in a bed, sofa or chaise longune comprising a back rest 5 being hinged to a seat 2 that is hinged to a foot part or shutter 3. The back rest is hinged in a rotatable joint at the lower part of this, just above the hinging to the seat. Likewise, the seat is hinged to a rotatable joint, where there also is a slide to receive longitudinal movement in relation to the backrest. for the same reason, the lower part of the shuttle is attached to a slide guide. The angle between the back rest ad the seat is adjustable in preset levels. The angle is locked in each level.

It is an object of the present invention to provide a chaise longue being easy to readjust during use by redistribution of body mass. Furthermore, is is an object to provide an adjustable chaise longue having a basic and robust design without too many movable parts. The structure comprises a hinged joint being easy to mount and maintain. There will be little wear of the joint and it will consequently have a long durability. Due to the relatively simple design, the production costs will also be lower.

This is obtained by a chaise longue according to the attached claim 1, and a flexible joint according to claim 4.

Figure 1:
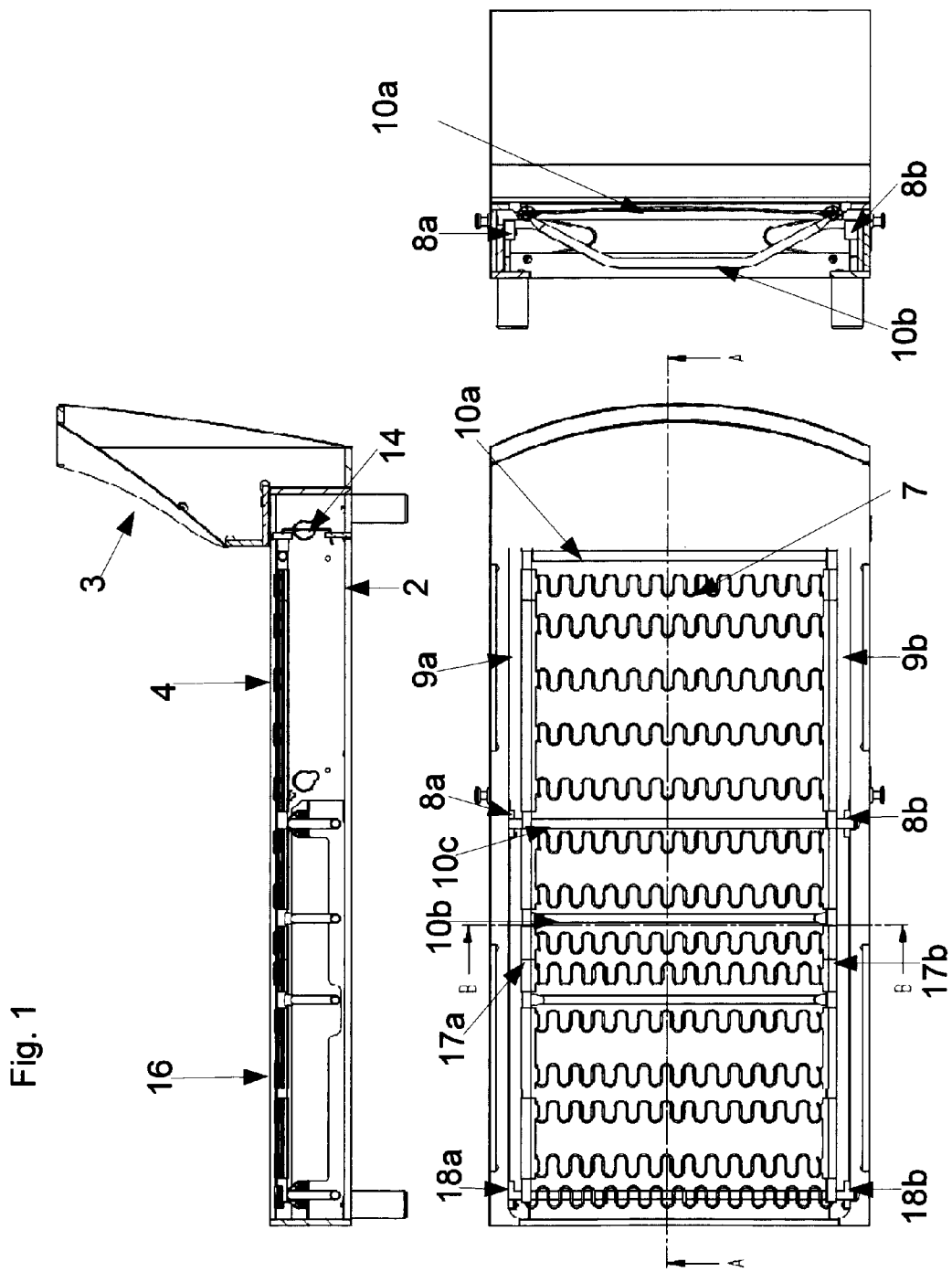
Figure 2:
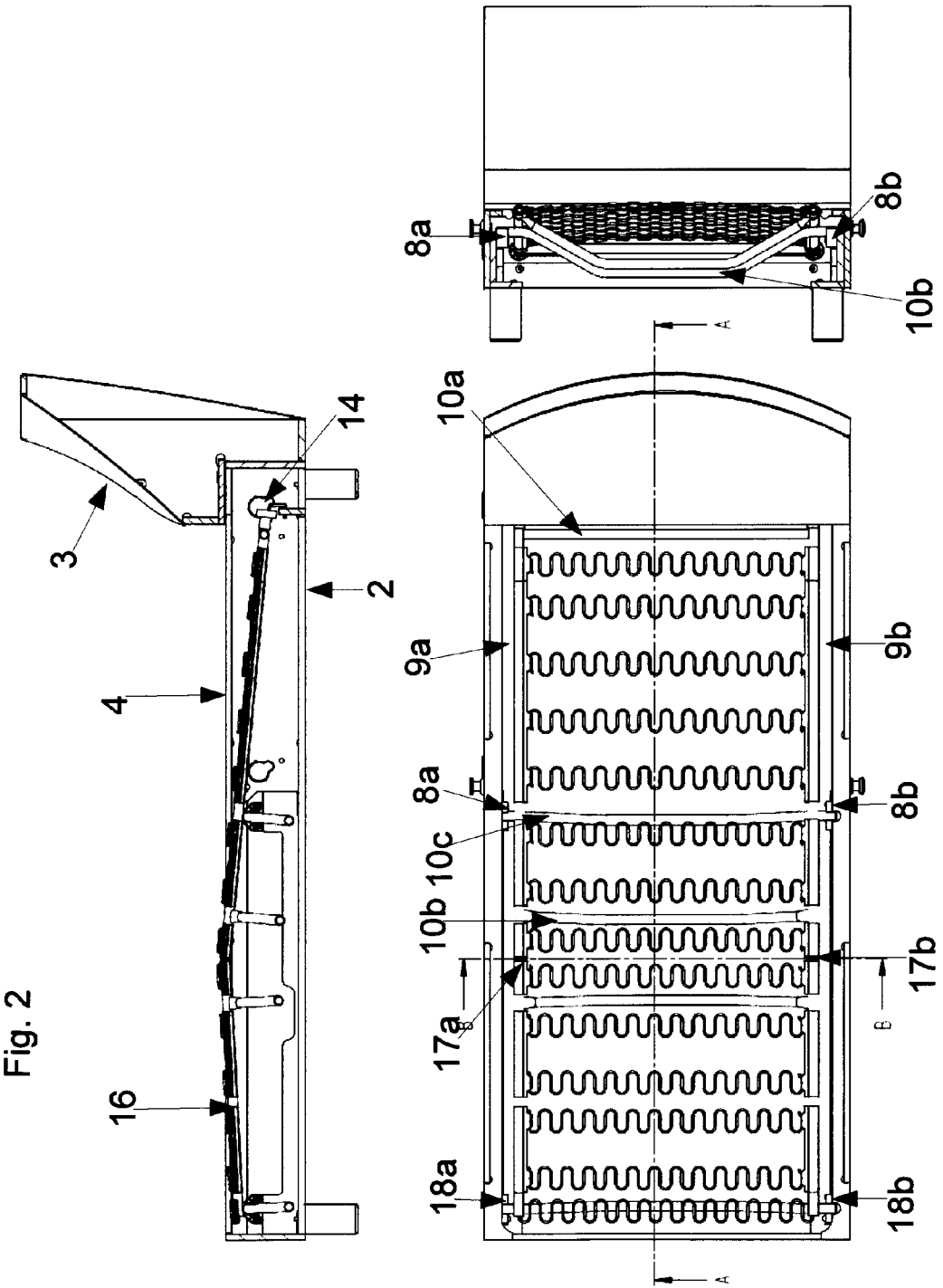
Figure 3B:
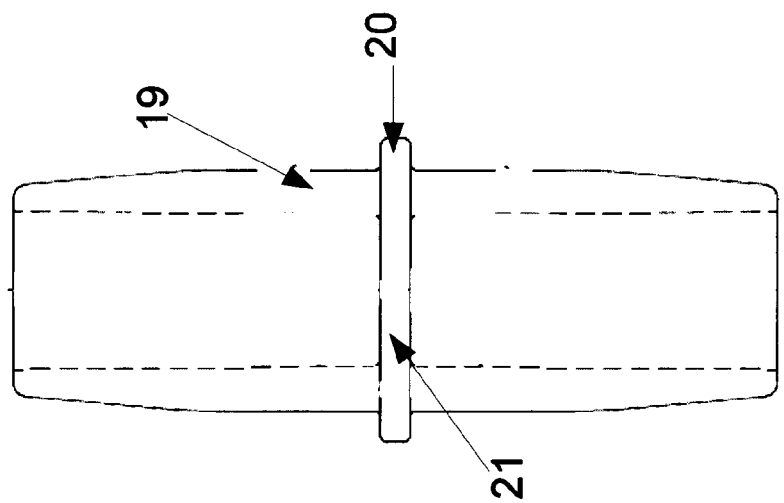
Figure 3A:
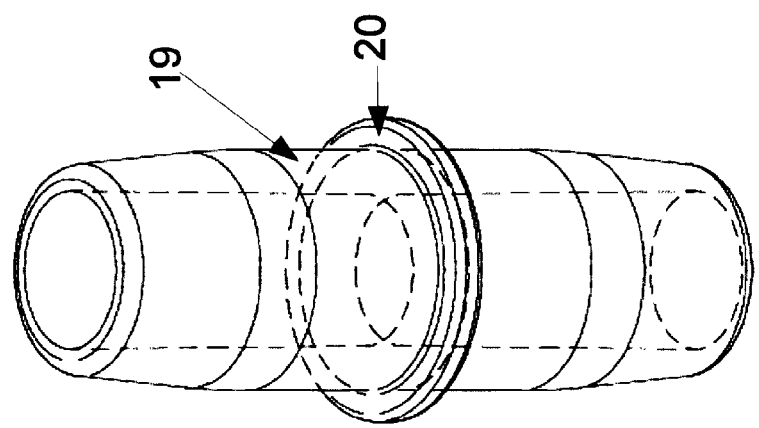
Figure 4:
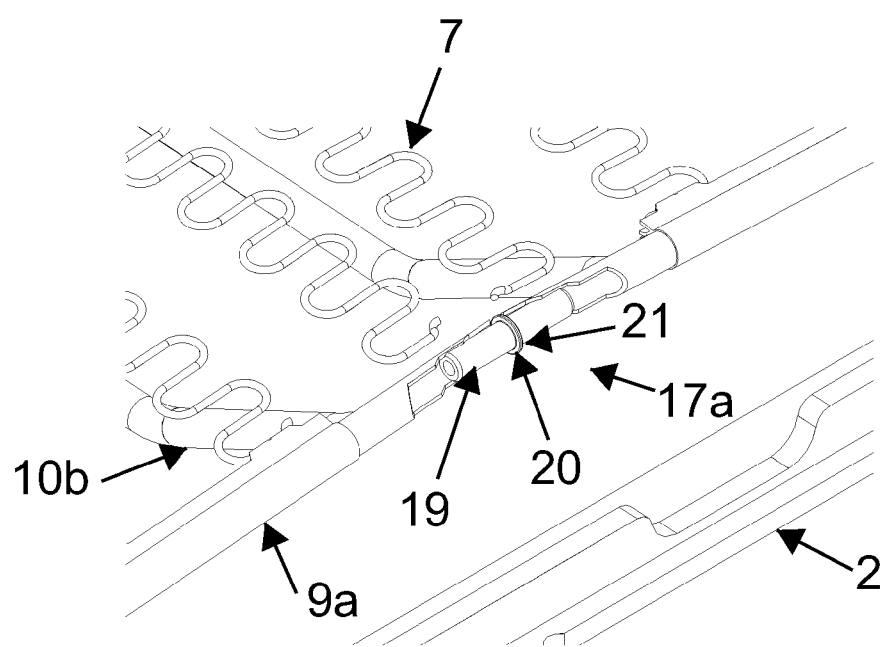

The sitting arrangement will be further described by means of embodiments in the attached drawings where:

FIG. 1 shows a chaise longue according to the invention, in plane, longitudinal section and cross section, FIG. 2 shows the chaise longue with the seat in a second position, FIG. 3 shows a flexible joint being a part of the chaise longue, in perspective a and cross section b, FIG. 4 shows the hinge point of the chaise longue with the elastic coupling.

FIG. 1 shows a chaise longue according to the invention. It comprises a fixed back rest 3, a seat part 4 with a bottom frame 6, seat springs 7 and rotatable mounting devices 8a, b. The seat frame or bottom frame 6 of the embodiment has the shape of a quadrangle with four sides forming two mainly straight parallell side bars 9a, 9b being arranged on the sides being parallell with the longitudinal direction of the chaise longue, and two parallell cross bars 10a, 10b along the two remaining sides of the quadrangle. The seat springs 7 are streched over the bottom frame 6 between the side bars 9a, 9b thereby forming a resilient sitting plane, whereon a cushion or the like can be placed. The sitting part is attached to the frame of the sofa 2 by means of rotatable mounting devices 8a, b. More precisely, the bottom frame comprises a a third cross bar 10c being prolonged over the periphery of the bottom frame, and where the ends of the cross bar is suspended in mounting devices 8a, b of the sofa frame. The mounting devices are in the form of bearing blocks that can be made in any suitable materiale, such as three or metall, but which are preferably made in a plastic material, like here. The third cross bar form a further reinforcing element, but otherwise the suspension arrangement can be implemented in a simpler way, for example by welding short pipe sockets to the frame, which in return anchor the mounting devices to the sofa frame.

In the shown embodiment, the mounting devices 8a,b are attached asymmetrically to the frame in relation to a centre axis through the seat part 4, so that the fulcrum joint will be between the knee and the hip of a user sitting in an ordinary manner with parallell legs and the back resting towards the back rest of the chaise longue. The mounting device can as an example be arranged ⅓ of the distance from the front edge of the seat. It is an intention that the mounting device 8 is araanged in such a way that it performa self balancing tilt. The mounting device is preferably not provided with a lock or adjustable brake, as the tilt is confined by the mounting mechanism and the placement of this, in combination with blance springs 14. However, the chaise longue can be provided with some sort of final stops limiting the swing of the seat part.

The chaise longue is provided with balance springs 14. In the shown figures, the balance springs are arranged between-the bottom frame ad the sofa frame below the back rest. However, the balance springs 14 can be arranged along the side panels of the sofa frame 2 in stead of in the side of the sofa frame below the back rest. A skilled person that will constructa sitting arrangement according to the invention, are ree to arrange spring devices where it is the most appropriate to obtain a desired balance in the seat part and sufficient resistance against tilting in order to make the tilting of the seat part comfortable for the user. There can also be used other kinds of spring devices, such as flat coil springs, leaf springs, rubber band devices or arrangements, torsional springs or others. In stead of arranging these at the end parts of the cross bars, the springs can be arranged in relation to the rotatable mounting arrangement between the seat part and the bottom frame.

At the front edge of the seat part a shutter or flap 16 is hinged in hinge points 17a,b. The flap is also rotatably attached to the sofa frame 2 at the opposite end of the attachement to the seat part, in rotatable mounting places 18a,b. When the seat part 4 is tilting in one direction, the flap 16 will tilt in opposite phase with this and thereby forming a "bend" or break in the sitting plane or surface and an elevation in the area by the knees of one sitting in the chaise longue provided with the sitting arrangement. This will increase the sitting comfort to a user sitting in the chaise longue. If the user chooses to lie down or more than one person are sitting onthe chaise longue, the seat part will tilt back in passiv position, so that a straight continuous sitting surface is formed, suitable for accommodating one person lying down, more persons sitting og persons partially slung on the sofa.

FIG. 2 shows the chaise longue with the seat part 4 in a second position, where the seat part is tilted downwards towards the back rest 3. When the seat part is tilted the cross bar 9 closest to the back rest 3 tilt downwards, while the cross bar 9 closest to the flap 16 tilt upwards. The flap 16 thereby tilt upwards closest to the seat part 4 and will rotate around rotatable mounting member 18a,b so that flap 16 and seat part 4 form an angle larger that 0° in relation to each other. This will be the case when someone for example leans towards the back rest 3 of the sitting arrangement.

Compared to other known solutions for a chaise longue or longseat, the present solution is distinguished by the seat and flap being hinged in a hinge point 17 between the seat and flap. In a fist embodiment, the hinging can be conventional, with an ordinary to-part hinge with two socket pieces for connecting to the frame. The hinge can in a first end be firmly connected to the frame while the other end is allowed to slide freely inside the tube of the frame. Both ends are also allowed to slide freely inside the tubes. Thereby, in the hinge point, the frame will separate to some extent when the seat is tilted upwards.

Preferably the hinge point is realized as an elastic coupling as shown in FIG. 3a and b. This is made of a socket piece 19 of an elastic polymeric material. The socket piece is conical towards both ends and is provide with a neck or collar 20 in the centre. The socket piece is preferably completely or partly sealed with a wall 21 in the middle of the tube. This coupling is easy to mount as it is merely slided into the pipe ends of the frames. It is made in one single piece and is consequently wearproof. Furthermore, it will not creak when used.

The invention claimed is:

1. A chaise longue comprising:
   a sofa frame (2), seat part (4) and back rest (3),
       where the seat part (4) comprises side bars (9a, b), cross bars (10a, b) and seat springs (7), characterized in that the back rest (3) is fixed, the seat part (4) is rotatably connected to the sofa frame (2) by means of mounting devices (8a, b) below a sitting surface of the seat part,
       wherein the mounting devices (8a, b) support the seat part (4) and allow for tilting of the seat part (4) within the sofa frame (2),
   one or more balance springs (14) are attached between the seat part (4) and the sofa frame (2),
       wherein the balance springs (14) provide resistance to the seat part (4) tilting within the sofa frame (2) maintaining balance to the seat part (4),
   a flap (16) is rotatably mounted to the seat part (4) with pivotable joints (17a,b), the flap is rotatably connected to the sofa frame (2) by means of mounting places (18a, b) at the opposite end from the pivotable joints (17a,b),
       wherein the mounting places (18a, b) support the flap (16) and allow for tilting of the flap (16) within the sofa frame (2),
   wherein the seat part (4) and flap (16) have a first position and a second position,
       in the first position, the seat part (4) and flap (16) form an approximately straight continuous sitting surface, and
       in the second position, the seat part (4) is tilting downwards towards the back rest (3), resulting in the flap (16) tilting in the opposite direction due to the pivotable joints (17a,b), wherein the seat part (4) and the flap (16) form an angle larger than 0° in relation to each other.

2. The chaise longue according to claim 1, where the mounting devices (8a b) are arranged at approximately ⅓ of the distance from the front frame element (2c).

3. The chaise longue according to claim 1, where at least one pivotable joints (17a, b) is elastic,
   the elastic pivotable joint (17a, b) comprises, a tubular formed sleeve or pipe socket (19) being conical in both ends, and a collar (20) arranged at the centre of the pipe socket,
       wherein the sleeve (19) and the collar (20) is produced in a suitable polymeric material,
       wherein one end of the sleeve (19) is engaged with the side bars (9a,b) of the seat part (4) and the opposite end of the sleeve (19) is engaged with the side bars (9a,b) of the flap (16).

4. The chaise longue according to claim 3, where the tubular formed sleeve comprises an internal wall (21) completely or partly sealing the sleeve.

5. The chaise longue according to claim 1, where at least one pivotable joints (17a, b) is elastic,
   the elastic pivotable joint (17a, b) comprises, a tubular formed sleeve or pipe socket (19) being conical in both ends, and a collar (20) arranged at the centre of the pipe socket,
       wherein the sleeve (19) and the collar (20) is produced in a suitable polymeric material,
       wherein one end of the sleeve (19) is engaged with the side bars (9a,b) of the seat part (4) and the opposite end of the sleeve (19) is engaged with the side bars (9a,b) of the flap (16).

6. The chaise longue according to claim 5, where the tubular formed sleeve comprises an internal wall (21) completely or partly sealing the sleeve.

* * * * *